US012559353B2

(12) United States Patent
Mannari et al.

(10) Patent No.: US 12,559,353 B2
(45) Date of Patent: Feb. 24, 2026

(54) DETERMINING POSITION OF A CONTAINER HANDLING EQUIPMENT

(71) Applicant: Konecranes Global Corporation, Hyvinkää (FI)

(72) Inventors: Ville Mannari, Hyvinkää (FI); Jussi Lehtiö, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 324 days.

(21) Appl. No.: 18/245,086

(22) PCT Filed: Sep. 16, 2021

(86) PCT No.: PCT/FI2021/050611
§ 371 (c)(1),
(2) Date: Mar. 13, 2023

(87) PCT Pub. No.: WO2022/058654
PCT Pub. Date: Mar. 24, 2022

(65) Prior Publication Data
US 2023/0356985 A1      Nov. 9, 2023

(30) Foreign Application Priority Data

Sep. 18, 2020    (FI) ..................................... 20205907

(51) Int. Cl.
| | |
|---|---|
| *B66C 13/46* | (2006.01) |
| *B66C 13/48* | (2006.01) |
| *G01S 17/42* | (2006.01) |
| *G01S 17/88* | (2006.01) |

(52) U.S. Cl.
CPC .............. *B66C 13/46* (2013.01); *B66C 13/48* (2013.01); *G01S 17/42* (2013.01); *G01S 17/88* (2013.01)

(58) Field of Classification Search
CPC ....... B66C 13/46; B66C 13/48; B66C 19/007; G01S 17/42; G01S 17/88; G01C 21/04
See application file for complete search history.

(56) References Cited

U.S. PATENT DOCUMENTS

| | | | |
|---|---|---|---|
| 2012/0092643 A1* | 4/2012 | Rintanen | ................. B66C 13/46 356/4.01 |
| 2018/0189716 A1* | 7/2018 | Crone | .................. G06Q 10/083 |
| 2020/0103914 A1 | 4/2020 | Holz et al. | |

FOREIGN PATENT DOCUMENTS

| | | |
|---|---|---|
| CA | 2 845 776 A1 | 3/2013 |
| CN | 102439481 A | 5/2012 |
| CN | 111175788 A | 5/2020 |

(Continued)

OTHER PUBLICATIONS

Marquis, Roger; article "ShotCode Barcodes" from website "Marquis on Marketing". Published May 18, 2010. (Year: 2010).*

(Continued)

*Primary Examiner* — Uzma Alam
*Assistant Examiner* — Paul Schnase
(74) *Attorney, Agent, or Firm* — Birch, Stewart, Kolasch & Birch, LLP

(57) ABSTRACT

A method comprising detecting a reflector unit that comprises a plurality of reflector elements arranged in a predetermined manner with respect to each other, identifying the reflector unit based, at least partly, on its characteristics, and determining a location of a container handling equipment based, at least partly, on the identified reflector unit.

14 Claims, 6 Drawing Sheets

(56)     References Cited

FOREIGN PATENT DOCUMENTS

| | | |
|---|---|---|
| EP | 2 699 940-81 | 11/2017 |
| WO | 2008057504 A2 | 5/2008 |

OTHER PUBLICATIONS

Extended European Search Report for European Application No. 21868784.5, dated Sep. 12, 2024.
Chinese Office Action and Search Report for Chinese Application No. 202180063562.9, dated Mar. 25, 2025, with English translation.

\* cited by examiner

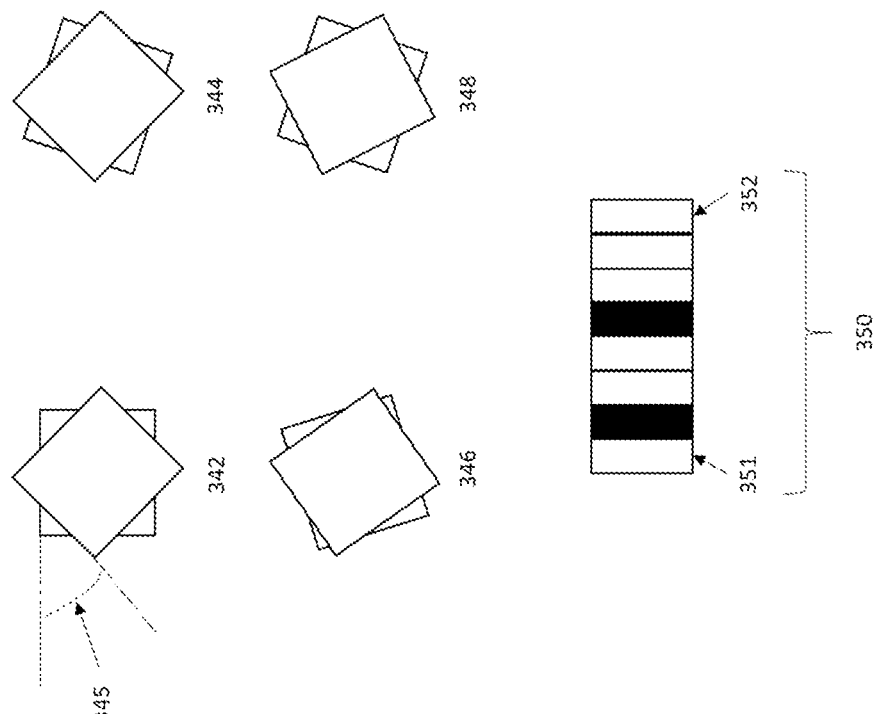
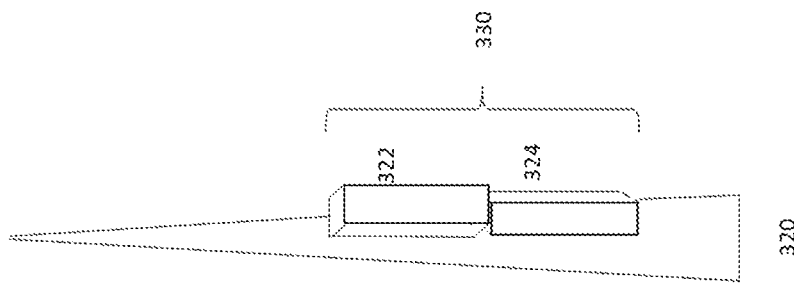
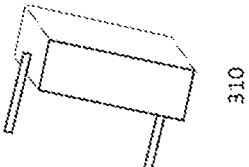
Figure 3

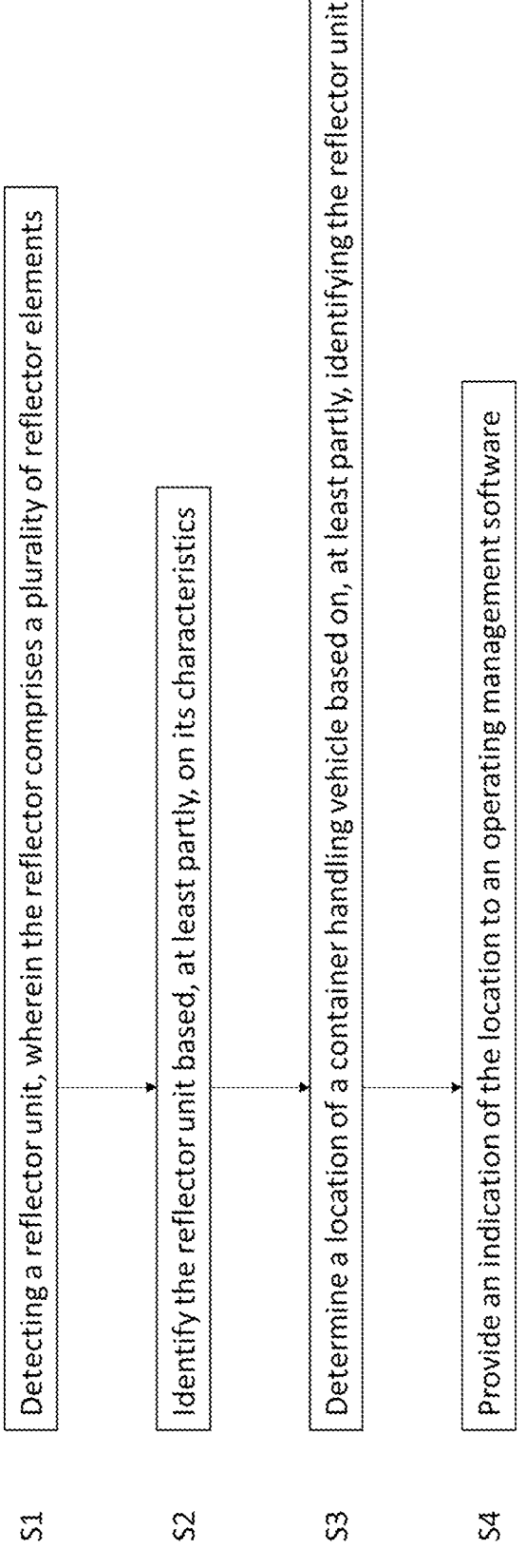

S1    Detecting a reflector unit, wherein the reflector comprises a plurality of reflector elements S2    Identify the reflector unit based, at least partly, on its characteristics S3    Determine a location of a container handling vehicle based on, at least partly, identifying the reflector unit S4    Provide an indication of the location to an operating management software

Figure 4

DETERMINING POSITION OF A CONTAINER HANDLING EQUIPMENT

TECHNICAL FIELD

The present application relates to determining position of an equipment that may be used for moving containers.

BACKGROUND

Container handling equipment, such as straddle carriers, rail-mounted gantry cranes, automated guided vehicles, lift trucks, reach stackers, terminal trucks and/or rubber-tyred gantry cranes, are utilized for moving containers in areas such as port terminals and intermodal yards. Further, some container handling equipment, for example straddle carriers, may also be utilized in other areas such as manufacturing and construction, for handling oversized loads such as steel and pre-cast concrete. To improve safety and efficiency, automatization of container handling equipment may be beneficial and thus a container handling equipment, if it is an automated container handling equipment, may have at least partial autonomy in how it moves within the area in which it is used for lifting and/or transporting goods. For the automated container handling equipment to function properly, the location of the straddle carrier is to be known.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to an aspect there is provided a method comprising detecting a reflector unit that comprises a plurality of reflector elements arranged in a pre-determined manner with respect to each other, identifying the reflector unit based, at least partly, on its characteristics, and determining a location of a container handling equipment based, at least partly, on the identified reflector unit.

According to an aspect there is provided an apparatus comprising means for detecting a reflector unit that comprises a plurality of reflector elements arranged in a pre-determined manner with respect to each other, identifying the reflector unit based, at least partly, on its characteristics, and determining a location of a container handling equipment based, at least partly, on the identified reflector unit.

According to another aspect there is provided an apparatus comprising at least one processor, and at least one memory including a computer program code, wherein the at least one memory and the computer program code are configured, with the at least one processor, to cause the apparatus to detect a reflector unit that comprises a plurality of reflector elements arranged in a pre-determined manner with respect to each other, identify the reflector unit based, at least partly, on its characteristics, and determine a location of a container handling equipment based, at least partly, on the identified reflector unit.

According to another aspect there is provided a computer program product which when executed by a computing apparatus causes the computing apparatus to perform detect a reflector unit that comprises a plurality of reflector elements arranged in a pre-determined manner with respect to each other, identify the reflector unit based, at least partly, on its characteristics, and determine a location of a container handling equipment based, at least partly, on the identified reflector unit.

According to an aspect there is provided a computer program product comprising computer program code stored in a non-transitory memory medium, the computer program code being configured to cause an apparatus, when executing the program code by a processor circuitry, to perform at least the following: detect a reflector unit that comprises a plurality of reflector elements arranged in a pre-determined manner with respect to each other, identify the reflector unit based, at least partly, on its characteristics, and determine a location of a container handling equipment based, at least partly, on the identified reflector unit.

BRIEF DESCRIPTION OF THE DRAWINGS

FIG. 3 illustrates exemplary embodiments of a reflector element and a reflector unit comprising a plurality of reflector elements.

FIG. 4 illustrates a flow chart according to an exemplary embodiment.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

When large objects such as containers are to be moved around and stacked on top of one another, safety of personnel is of major importance. Having container handling equipment that may perform the moving and stacking in automated manner, or with minimal guidance performed by a person, may therefore be desirable. Examples of such container handling equipment comprise rail-mounted gantry cranes, rubber-tyred gantry cranes, straddle carriers, automated guided vehicles, lift trucks, reach stackers and terminal trucks.

Container handling equipment may be operated by a driver or it may be automated, or it may be operated using a combination of both. For example, a container handling equipment such as a straddle carrier may be operated without a driver sitting in the straddle carrier and such a straddle carrier may also be called as an automated straddle carrier. Straddle carriers, that are one type of a container handling equipment, may be utilized in general in an outdoors environment, for example in port terminals and intermodal yards for stacking and moving containers. The containers may be ISO standard compliant. A straddle carrier operates by straddling its load, picking it up and carrying it by connecting to the container's top lifting points using a container spreader. A straddle carrier may travel at relatively low speeds such as up to 30 km/h or 20 mph.

Another type of container handling equipment is a gantry crane, in general, may be understood as a crane that is built atop a gantry. Gantry cranes may vary from gantry cranes, capable of lifting some of the heaviest loads in the world, to small cranes such as cranes capable of lifting automobile engines out of vehicles. The structure of a gantry crane may travel on wheels. The wheels may be rubber-tyred wheels that are intended to travel on flat, or substantially flat, surface or the wheels running along rails. A straddle carrier may be considered as one type of a rubber-tyred gantry crane.

Figure 1:
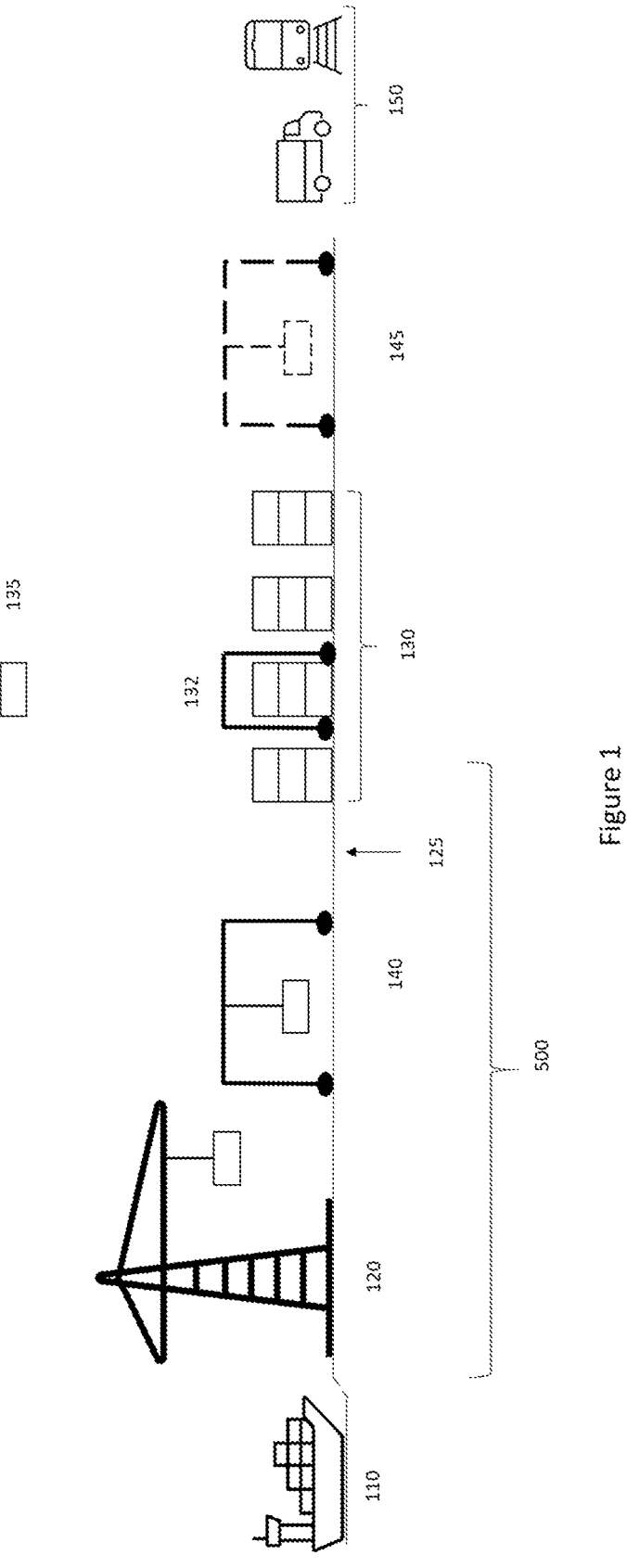
FIG. 1 illustrates an exemplary embodiment of an area in which a container handling equipment is utilized.

FIG. 1 illustrates an exemplary embodiment of an area, such as a container handling area that is a geographically limited area, in which one or more container handling equipment may be utilized. The environment in this exemplary embodiment is a port in which container ships may be loaded and unloaded of containers. In this exemplary embodiment a container ship 110 is being unloaded by a ship-to-shore crane 120 after which the containers 135 may be stacked to a dedicated stacking area 130 in the port. A container handling equipment 140, that in this exemplary embodiment is a straddle carrier, may be utilized to move a container 135 to a transfer area 125 after it has been unloaded by the ship-to-shore crane 120 to an unloading area. From the transfer area another container handling equipment such as a stacking crane 132, may then move the container to a certain place in the stacking area 130. In some exemplary embodiments, another container handling equipment 145, which may also be a straddle carrier, may then be utilized when container is loaded on to a truck or train 150 for further transportation. It is to be noted that the further transportation of a container may also be performed by other types of transportation vehicles such as trains 150. It is to be noted that the layout of a port area may vary and in this exemplary embodiment, the layout is simplified for the sake of ease of explanation. In general, a stacking area may be understood as an area comprising multiple parallel bays, and at both ends of each bay, there may be a dedicated transfer area where a container handling equipment such as a straddle carrier may deliver containers to be handled within the stacking area by another container handling equipment and, respectively, the said other container handling equipment may bring a container from a container stack in the stacking area to a transfer area, to be picked by the straddle carrier and transported to the ship-to shore crane.

In a container handling area, such as a port, there may be a plurality of container stacks and a plurality of container handling equipment, which may be of various types, that are operating and moving around at the same time. In order to improve efficiency and safety, automatization may be utilized for operating the container handling area that comprises moving and storing containers as well as loading and unloading them to vehicles. Utilizing automatization may result in reduced need for personnel to control and operate the container handling area. Yet there needs to be overall planning and guidance applying to the operation to avoid collisions and to make sure that correct equipment is in a correct place at the correct time and handling the correct container in a correct manner. Thus, for example in a container terminal an overall management is required. An operating management software may be used for such overall management. The overall management may comprise for example task planning, task scheduling, routing and onboarding aspects that are managed and controlled. The task planning may comprise plans regarding unloading a container ship. This planning may be performed by software program without user input or with some user input. A task may comprise identifying a container and its destination in the storage area. The tasks may then be scheduled using software. The software may independently schedule the tasks or user input may be provided to complete scheduling of the tasks. Scheduling may comprise assigning a container handling equipment to a task. The scheduling may take into account aspects such as timing, locations of the container handling equipment and job queues associated with the container handling equipment. When planning routing, an optimized route for each of the container handling equipment may be determined by the software with or without user input. When determining the routes, aspects such as currently assigned tasks to each container handling equipment and their current locations may be taken into account. At an onboarding stage, a container handling equipment may then execute a task and move a container from its current location to its target location. The container handling equipment may perform this part in automated manner. Automated manner of performing the task may however comprise a user supervising from a distance the container handling equipment. The supervising may be done on fleet level instead of, or in addition to, container handling equipment level. The supervising may comprise interventions by a user if necessary. For example, if a container handling equipment cannot detect its position, the user may resolve the problem by driving the equipment to another place from a remote location. Yet, when performing the task in an automated manner, the container handling equipment operates without a user in it.

A container handling area such as a port or a container terminal with automated container handling equipment also needs to verify that the container handling equipment do not collide with other container handling equipment or other vehicle and/or structures. An automated container handling equipment may also be understood as container handling equipment that may operate without a driver or may perform some operations in an automated manner and some operations with input from a driver. Therefore, in order to operate the container handling area efficiently and to ensure collisions are avoided, it is important to know the location of a container handling equipment in real-time. Thus, a container handling equipment, that may be an automated container handling equipment, needs to be positioned. Positioning a container handling equipment may be understood as determining its location within a geographical area. In general, when handling containers, a coarse position information may be sufficient for various purposes. For example, collisions of container handling equipment may be avoided and the containers may be identified and located if the positioning accuracy is about +/−1 meter. Yet, for efficient handling of containers, the positioning accuracy of the container handling equipment, for example straddle carriers, may need to be significantly better, for example +/−10 cm, which, for example, would allow a ship-to-shore gantry crane to pick up a container a straddle carrier has brought without having to move.

Various positioning techniques exist, and different positioning techniques may be utilized, alone or in a combination comprising two or more different techniques, to obtain a more robust positioning result when determining the position of a container handling equipment. Some positioning techniques are based on radio frequency, RF. An example of such positioning technique is a differential global positioning system, DGPS, that is an enhanced version of global positioning system, GPS and may provide positioning accuracy up to 1-3 cm. Yet, in a container handling area there may be plenty of large objects and steel structures that will block and/or reflect RF signals transmitted. Further, RF based positioning may be prone to interference and thereby causing errors that could lead to significant damage in a container handling area. Transponders installed to the ground, which upon receiving a signal sent by the container handling equipment, emit a specific unique signal in response, may also be utilized. In a container handling area transponders may be located in fixed locations within the container handling area which means that as a location of a transponder does not change, the location of a moving container handling equipment may be determined based on the known location of the transponder. Yet, as a container handling area may be a large one, the number of transponders required may be overwhelming and therefore it may not always be feasible to utilize transponders in all areas of a container handling area.

Laser-based solutions may be utilized to scan the environments and make determinations based on the scanned results. A container handling equipment may comprise a multi-layer lidar that is a device that allows measuring distances by illuminating a target area with laser light and then measures the reflection with a sensor. A multi-layer lidar may scan the target area in multiple planes. Detected differences in return times and wavelengths are then utilized for creating a 3D point cloud that represents the target area. Software algorithms may then be utilized to determine from the 3D point cloud what the environment is like and are there landmark objects, obstacles to avoid and so on. The software algorithms may be executed by a computing device that may be comprised in the multi-layer lidar or the computing device may be connected to the multi-layer lidar.

Figure 2:
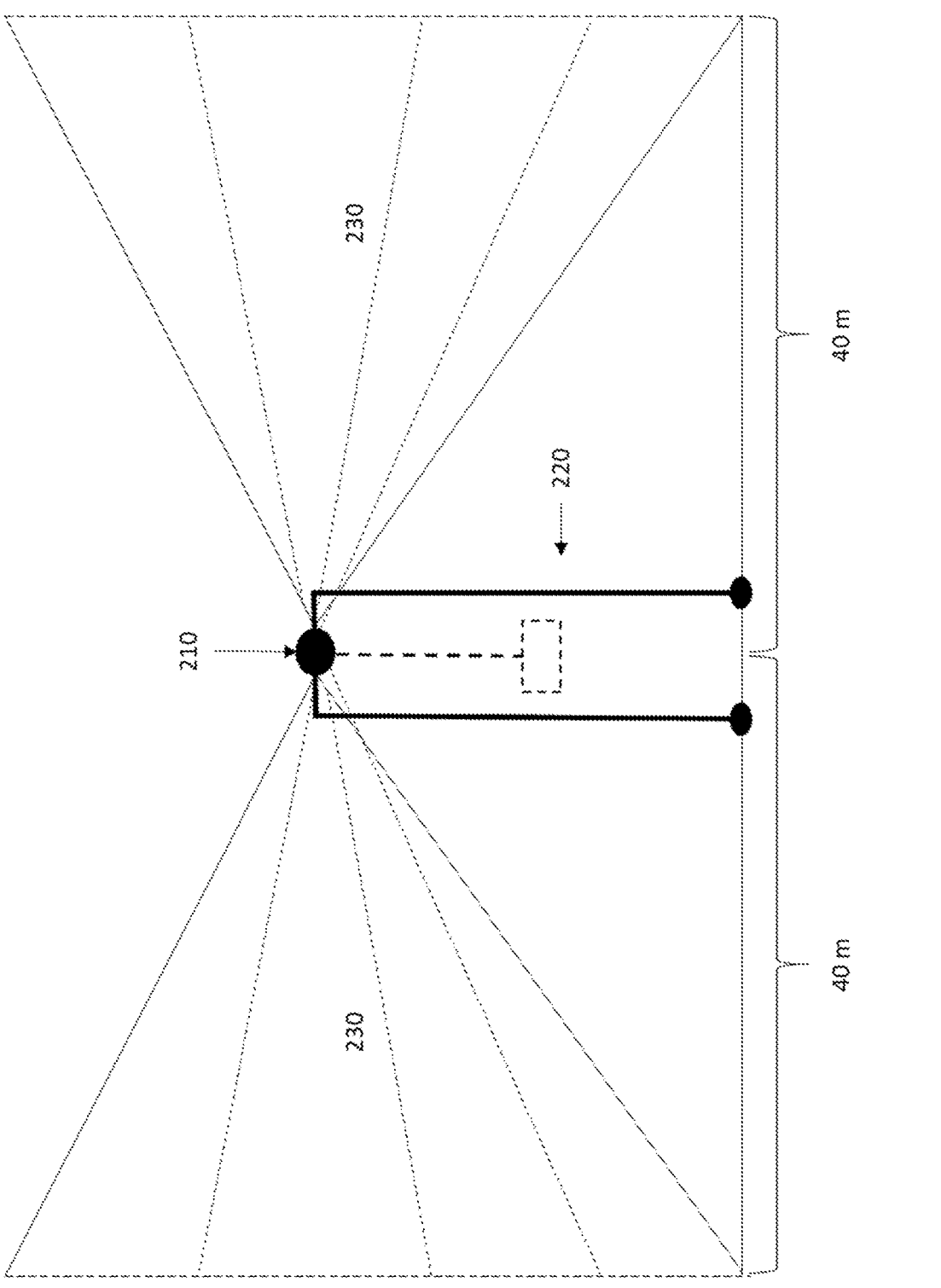
FIG. 2 illustrates an exemplary embodiment of a container handling equipment that comprises a multi-layer lidar.

FIG. 2 illustrates an exemplary embodiment of utilizing a multi-layer lidar. A multi-layer lidar 210 is comprised in a container handling equipment that in this exemplary embodiment is a straddle carrier 220 that is automated. The multi-layer lidar 210 is located on top of the straddle carrier 220 that may be used to move containers around a container handling area. As the multi-layer lidar 210 is located on top of the straddle carrier 220, it may obtain a 360 degree view around the straddle carrier 220 by turning around for example. In this exemplary embodiment, the multi-layer lidar 210 scans 16 layers and the distance between the layers is approximately 1.9 meters at 50 meters. The field of view 230 of the multi-layer lidar 210 extends to the ground at approximately 40 meters in this exemplary embodiment. The height at which the multi-layer lidar 210 is located at in this exemplary embodiment is 12 meters. As the multi-layer lidar scans the area around the straddle carrier 220, various objects may be detected. Yet, as the environment is a container handling area, multiple objects with the same size and shape exist thereby making it difficult to distinguish between the objects. If the objects cannot be distinguished from one another, it may be challenging to perform positioning based on detected objects and/or landmarks that are detected using the multi-layer lidar 210. In other words, it may be challenging to determine a position based on the detected environment using the multi-layer lidar 210 when the environment comprises repetitive structures. It is to be noted that the performance of the multi-layer lidar may in some other exemplary embodiments be different than that of the multi-layer lidar 210. It is to be noted though that in some other exemplary embodiments, other types of detection devices and technologies than a multi-layer lidar may be used in addition or alternatively to using the multi-layer lidar. Such technologies comprise, for example, time of flight cameras, radar sensors and/or stereo cameras.

A multi-layer lidar, or other optical detection used, may easily detect a reflective surface. A reflective surface may be obtained using any suitable reflective material. Yet, it is to be noted that even if material is not reflective, it may be considered to have reflective characteristics that may be categorized as being, at least substantially, non-reflective. A reflector unit may be understood as a reflective object made of a single reflector element or comprising a plurality of reflector elements that are adjacent to one another in a pre-determined manner. Adjacent reflector elements may be connected to each other or there may be a gap in between them. FIG. 3 illustrates exemplary embodiments of reflector units that comprise two or more reflector elements 310. A reflector element 310 has characteristics such as shape, size, orientation, reflectivity, and height, which may be the installation height of the reflector element. It is to be noted that the reflectivity characteristics may also be, at least substantially, non-reflective. The shape of a reflective element may be for example a cuboid, which may comprise one or more reflective sides, or a rectangle, or any other suitable shape. The characteristics of a reflector element may vary from one reflector element to another. As two or more reflector elements are combined into a reflector unit, the reflector unit also has characteristics such as size, shape, reflection pattern, height and width. The reflection pattern may be formed by adjacent reflector elements having different reflectivity characteristic. For example, one element may have non-reflective characteristics and an adjacent reflector element may have high reflectivity. Further, depending on how the two or more reflective elements are placed respective to one another, the characteristics of the reflector unit may vary meaning that although the reflector elements comprised in reflector units may be identical, the reflector units may have characteristics that allow the reflector units to be distinguished from one another. The combinations 342, 344, 346 and 348 illustrate how the positioning of reflector elements respective to one another may change the shape of the reflector unit 330 comprising those reflector elements. A reflector orientation 345 may be understood as angular positions of reflector elements respective to each other. The reflector orientation 345 may be used to differentiate reflector units from one another even when they comprise identical reflector elements.

In some exemplary embodiments, a reflector unit 350 may comprise a plurality reflector elements in form of planar reflective surfaces that together may form a barcode-type of reflective pattern. The reflector unit may have a pre-determined size and the relative location of the outmost reflector elements 351 and 352 may also be pre-determined. Additionally, there may be pre-determined locations for reflector elements in between the reflector elements 351 and 352. Thus, the reflector unit 350 may be identified based on its reflective pattern that is formed depending on if there is a reflection in a location of a reflective element or not. For example, if there is no reflective surface at a location dedicated for a reflector element of the reflector unit 350, the reflection may be substantially no reflection which is part of the reflection pattern of the reflector unit 350. In some other exemplary embodiments, the shape and size of the reflector units in between the outmost reflector elements may vary.

A reflector unit may then be attached to a stationary or non-stationary structure that is located within a container handling area, and the location of the said structure may be known. In FIG. 3 an example of a light pole 320 with reflector elements 322 and 324 forming a reflector unit 330 is illustrated. The characteristics of the reflector unit 330 may be such that they allow identifying the light pole 320 as light pole in general or as a specific light pole within the container handling area. In other words, all light poles may comprise reflector unit with same characteristics making them distinguishable as light poles though not necessarily identifying which light pole. Alternatively, the characteristics of the reflector unit 330 may be such that the light pole is identifiable as a certain light pole whose location within the container handling area is known. Further, in some exemplary embodiments, the reflector unit 330 may be such that the light pole is identifiable as belonging to a certain group of light poles.

Figure 5:
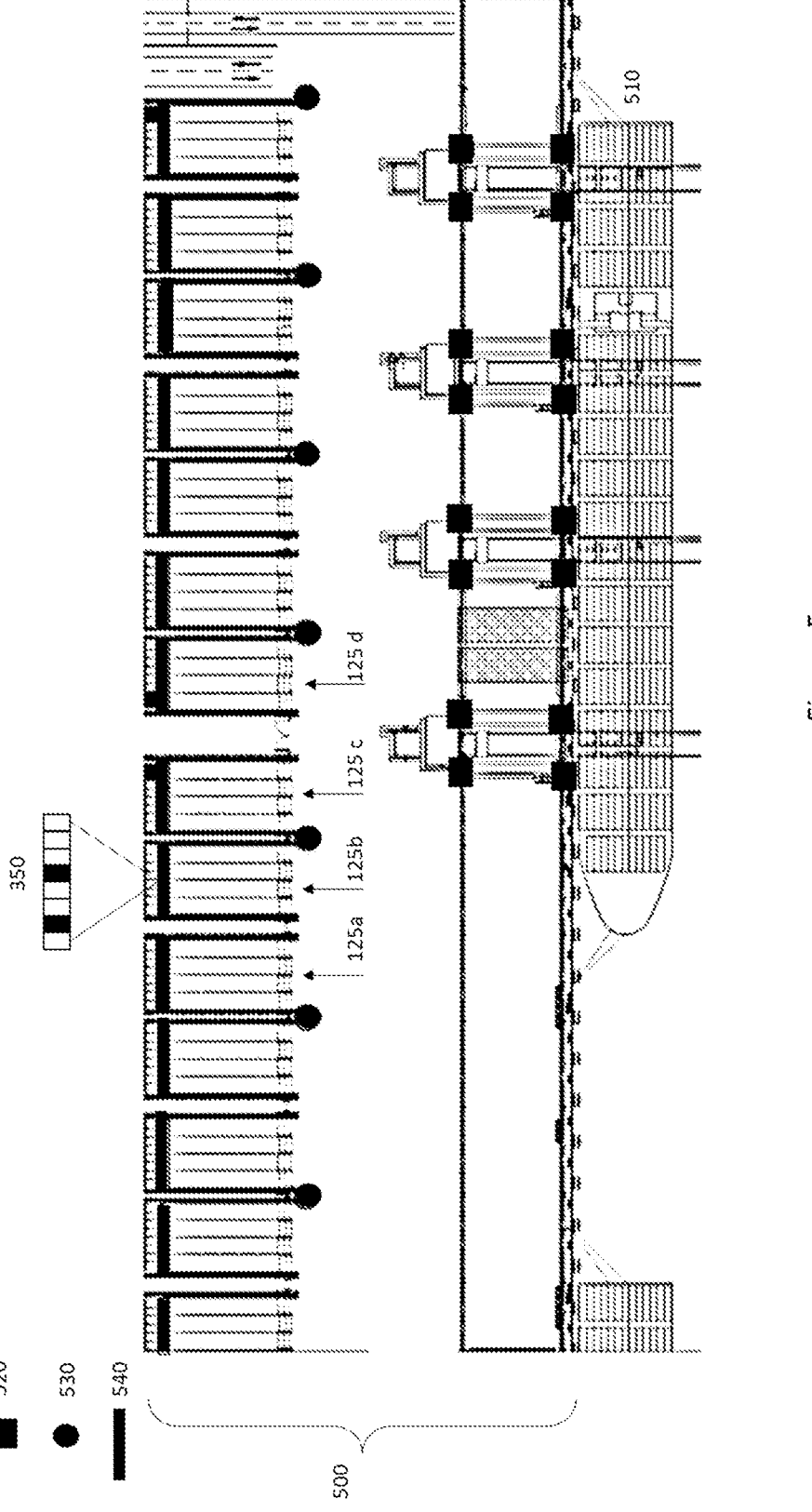
FIG. 5 illustrates an exemplary embodiment of a container handling area in which reflector units are utilized.

In addition to light poles, reflector units may be installed in other structures such as ship-to-shore cranes and/or those may be used to identify certain areas, for example to distinguish between the transfer areas 125*a*, 125*b*, 125*c*, 125*d* etc. located at the ends of container stacking areas as illustrated in FIG. 5. In a limited area such as a container handling area, landmarks may be uniquely identifiable by using reflector units with characteristics unique within that limited area. It is to be noted that a plurality of reflector elements may be used to form a reflector unit. The size of a reflector unit is to be such that a multi-layer lidar may detect it from a distance such as 50 meters for example. It is to be noted though that, in some exemplary embodiments, the size of a reflector unit may be related to the performance capability of a multi-layer lidar and therefore, the better the performance of a multi-layer lidar, the smaller the size of a reflector unit may be. The reflective characteristics of reflective elements may be obtained for example by covering the elements, at least partly, with reflective tape or reflective paint and/or by using paints of different colour. This may allow the multi-layer lidar to be able to detect the reflector elements based on their reflectivity. In some exemplary embodiments, the reflector elements may further comprise non-reflective parts and/or there may be nonreflective areas in between reflector elements comprised in a reflector unit.

In general, one or more reflector units may be utilized for various purposes. In an exemplary embodiment, reflector units installed in fixed structures, such as lamp posts, may be utilized for positioning purposes within a certain area such as a port area. In another exemplary embodiment, reflector units installed in non-fixed structures may provide positioning information for various purposes. For example, the reflector unit in non-fixed structures such as in ship to shore cranes may provide position information that may then be utilized to keep passing automated container handling equipment and/or other automated vehicles aligned with the driving lane. Additionally, or alternatively, the reflector units in the ship to shore cranes may enable precise relative positioning of the ship to shore crane and the automated container handling equipment, and thereby allow for efficient container transfer between the ship to shore crane and the automated container handling equipment.

Using a multi-layer lidar for detecting one or more reflector units may be utilized when positioning an equipment such as a container handling equipment that may be automated. Based on the detection of a reflector unit, that has a known position, using the multi-layer lidar, an XY-position of the equipment may be determined by running one or more software algorithms on a computing device that may be comprised in or connected to the multi-layer lidar. If multiple reflector units are detected and then identified based on their characteristics and the locations of the identified reflector units are known, then a relatively reliable and cost-efficient way of determining a location may be achieved. Yet, additionally also other methods of determining the location may be utilized. If no reflector units are detected at a given time by the multi-layer lidar that is comprised in a container handling equipment, then the travelled distance may be estimated based on laser data obtained from the multi-layer lidar for example.

In some exemplary embodiments, there may be a plurality of ship-to-shore gantry cranes in a port area that have reflector units that have the same characteristics except for the height at which the reflector unit is located at in the respective ship-to-shore gantry crane. In such exemplary embodiment, a container handling equipment comprising a multi-layer lidar may identify each ship-to-shore gantry crane based on the measured distance to their reflector units. This allows the container handling equipment to identify its relative position in view of a ship-to-shore gantry crane.

In some exemplary embodiments, for example when positioning is required in a large geographical area, in addition to utilizing reflector units to determine the location of an automated container handling equipment also other positioning methods may additionally be utilized. For example, it may be that it is not possible to create and install reflector units that would be unique with respect to each other within the whole geographical area. In such cases other positioning methods may be used to complement the reflector unit based positioning. For example, Wi-Fi access points may be utilized. If the reflector units that are located within the coverage area of a Wi-Fi access point are uniquely identifiable with respect to each other, then the reflector units may not need to be uniquely identifiable within the whole geographical area. In such exemplary embodiments, a Wi-Fi access point may be utilized to determine a coarse location of an automated container handling equipment and reflector units may then be utilized to determine a more precise location within the coverage area of the Wi-Fi access point.

FIG. 4 illustrates a flow chart according to an exemplary embodiment. First, in S1, a reflector unit is detected. The reflector unit comprises a plurality of reflector elements. A reflector unit may be uniquely identifiable in a limited area such as a container handling area based the characteristics of the reflector elements. It is to be noted that even if the reflector elements were identical as such, their positioning respective to one another may result in a reflector unit that has different characteristics compared to the other reflector units within the limited area. For example a reflector angle and/or the number of reflector elements comprised in a reflector unit may vary between the reflector units even if the reflector elements as such were identical. The position of a reflector unit may be stable, and it may be known. This is beneficial as it allows detection to be performed as many times as needed, whenever it is needed and by multiple detecting devices simultaneously. In this exemplary embodiment, the detection is performed using a multi-layer lidar and the multi-layer lidar is comprised in an automated container handling equipment. The multi-layer lidar may be located on top of the automated container handling equipment and it may rotate such that a 360 scanning of the environment may be enabled. Thus, the multi-layer lidar may detect not only one reflector unit but a plurality of reflector units when performing the scanning.

Next, in S2, the reflector unit is identified based on its characteristics. The identifying may be done using one or more software algorithms based on data obtained from the multi-layer lidar. The software algorithms may be run using a computing apparatus that is comprised in the multi-layer lidar or is connected to the multi-layer lidar. For example, in case the running of the one or more algorithms requires more resources than is available in a computing device comprised in the multi-layer lidar, the data obtained by the multi-layer lidar may be for example pre-processed and then transmitted to another computing device for further processing based on which the identifying may then be performed. Alternatively, the data obtained by the multi-layer lidar may be processed by running the one or more algorithms in a computing apparatus comprised in the multi-layer lidar and then identify the reflector unit, or in some exemplary embodiments, multiple reflector units.

In S3, once the reflector unit has been identified, a location of the automated container handling equipment is then determined based on the identified reflector unit. As the location of the reflector unit is known and the multi-layer lidar provides information regarding the distance to the reflector unit, as well as the direction in which the reflector unit is respective to the automated container handling equipment, the location of the automated contained handling equipment may be determined. It is to be noted that also other methods for obtaining the location may be utilized and that may be done additionally or alternatively. If more than one reflector unit is identified, then the location of the automated container handling equipment may determine its location based on the known locations, distances, and directions of the identified reflector units. The automated container handling equipment may utilize the obtained location information in verifying that it stays on the intended route and/or when it is delivering a container to a destination location or picking up a container, to verify that the pick up or drop-off location is correct.

In S4 the determined location of the automated container handling equipment is provided to an operating management software that is used to operate the limited area within which the reflector units are located and within which the automated container handling equipment operates. This may be done by providing an indication of the location to the operating management software. The indication may be provided periodically or continuously. The indication may be provided even if the method for obtaining the location information changes, thus, providing the indication may be independent of the method used for obtaining the location. The operating management software may be for example such as described above, and it may plan tasks and routes and allocate those to various container handling equipment. It is desirable to be aware of the locations of the moving objects within the area and to be able to predict their movement and operations. For example, if the current position of a container handling equipment as well as its destination position are known, it may be estimated when another task may be assigned to the container handling equipment. Therefore, the location information is beneficial to ensure that operations are executed as planned and that the automated container handling equipment is on a correct route and/or correct place at any given time, and on the other hand, if the location is not what it is expected to be, and/or if a collision may be about to occur, it may be evaluated if corrective measures are to be taken. Such measures may be, for example, a command to the equipment to stop or change its route, or to provide an alert to a user who controls operations at the limited area. Additionally, or alternatively, the location may further be provided to other container handling equipment operating in the limited area as well. In some exemplary embodiments, equipment to equipment communication may also be possible.

Although in the exemplary embodiment described above there is one reflector unit that is detected and identified, in some other exemplary embodiments there may be a plurality of reflector units that are to be detected and their combination is to be identified for determining a location. In such exemplary embodiments, for example a ship-to-shore gantry crane may comprise in its left front leg, i.e. in one corner of the crane, a reflector unit that identifies it as a left front leg of the ship-to-shore gantry crane. Another reflector unit on the same ship-to-shore gantry crane may then be used to identify the said ship-to-shore gantry crane from other ship-to shore gantry cranes that also comprise a reflector unit for identifying their left front legs.

FIG. 5 illustrates an exemplary embodiment in which reflector units are utilized in the port in area 500. A container ship 510 may be unloaded and loaded using ship-to-shore gantry cranes that are identifiable by reflector units 520 and/or 530 that are attached to their legs or to other structural parts. Each reflector unit may be uniquely identifiable or alternatively, there may be multiple reflector units in one ship-to-shore gantry crane. In an exemplary embodiment, a ship-to-shore gantry crane comprises at least two reflector units placed such that at least one of them is detectable to a multi-layer lidar comprised in an automated container handling equipment such as a straddle carrier. The ship-to-shore gantry crane may then be identified based on the detected reflector unit. It is to be noted that in some exemplary embodiments at least two reflector units are visible in every situation to the multi-layer lidar and the at least two reflector units then are utilized to identify the ship-to-shore crane. In a same manner there are reflector units 530 attached to light poles and reflector units 540 attached to traffic light platforms of a transfer area 125. In this exemplary embodiment, a reflector element comprised in a reflector unit 530 has a shape of a cuboid that has length of 0.5 meters, width of 0.5 meters and height of 2.5 meters. The light poles in this exemplary embodiment are 60 meters away from each other. The reflector elements comprised in a reflector unit 530 are stacked on top of each other and may be distinguishable by the reflector angle at which they are rotated respective to each other. In some exemplary embodiments, there may further be a reflector unit such as the reflector unit 350 introduced in FIG. 3 attached to a structure, that may be a horizontal structure, and it may be located above a transfer area and comprise also traffic lights. The reflector unit may then uniquely identify the structure and thus the location may also be determined.

The apparatus 600 is an exemplary embodiment of a computing apparatus. The computing apparatus may be comprised in or connected to for example an automated container handling equipment or a multi-layer lidar. The apparatus 600 comprises a processor 610. The processor 560 interprets computer program instructions and processes data. The processor 610 may comprise one or more programmable processors. The processor 610 may comprise programmable hardware with embedded firmware and may, alternatively or additionally, comprise one or more application specific integrated circuits, ASICs.

The processor 610 is coupled to a memory 620. The processor is configured to read and write data to and from the memory 620. The memory 620 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 620 further stores computer readable instructions that are execute by the processor 610. For example, non-volatile memory stores the computer readable instructions and the processor 610 executes the instructions using volatile memory for temporary storage of data and/or instructions. The memory may also save data such as values.

The computer readable instructions may have been pre-stored to the memory 620 or, alternatively or additionally, they may be received, by the apparatus, via electromagnetic carrier signal and/or may be copied from a physical entity such as computer program product. Execution of the computer readable instructions causes the apparatus 600 to perform functionality described above.

In the context of this document, a memory or computer-readable media may be any non-transitory media or means that can contain, store, communicate, propagate or transport the instructions for use by or in connection with an instruction execution system, apparatus, or device, such as a computer.

The apparatus 600 further comprises, or is connected to, an input unit 630. The input unit 630 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 630 may comprise an interface to which external devices may connect to.

The apparatus 600 also comprises an output unit 640. The output unit may comprise for example one or more displays capable of rendering visual content such as a light emitting diode, LED, display or a liquid crystal display, LCD. The output unit 640 may further comprise one or more audio outputs such as loudspeakers or a set of headphones.

The apparatus 600 may further comprise a connectivity unit 650. The connectivity unit 650 enables wired and/or wireless connectivity to external networks such as Bluetooth or Wi-Fi. The connectivity unit 650 may comprise one or more antennas and one or more receivers that may be integrated to the apparatus 600 or the apparatus 600 may be connected to. The connectivity unit 650 may comprise an integrated circuit or a set of integrated circuits that provide the wireless communication capability for the apparatus 600. Alternatively, the wireless connectivity may be a hard-wired application specific integrated circuit, ASIC.

Figure 6:
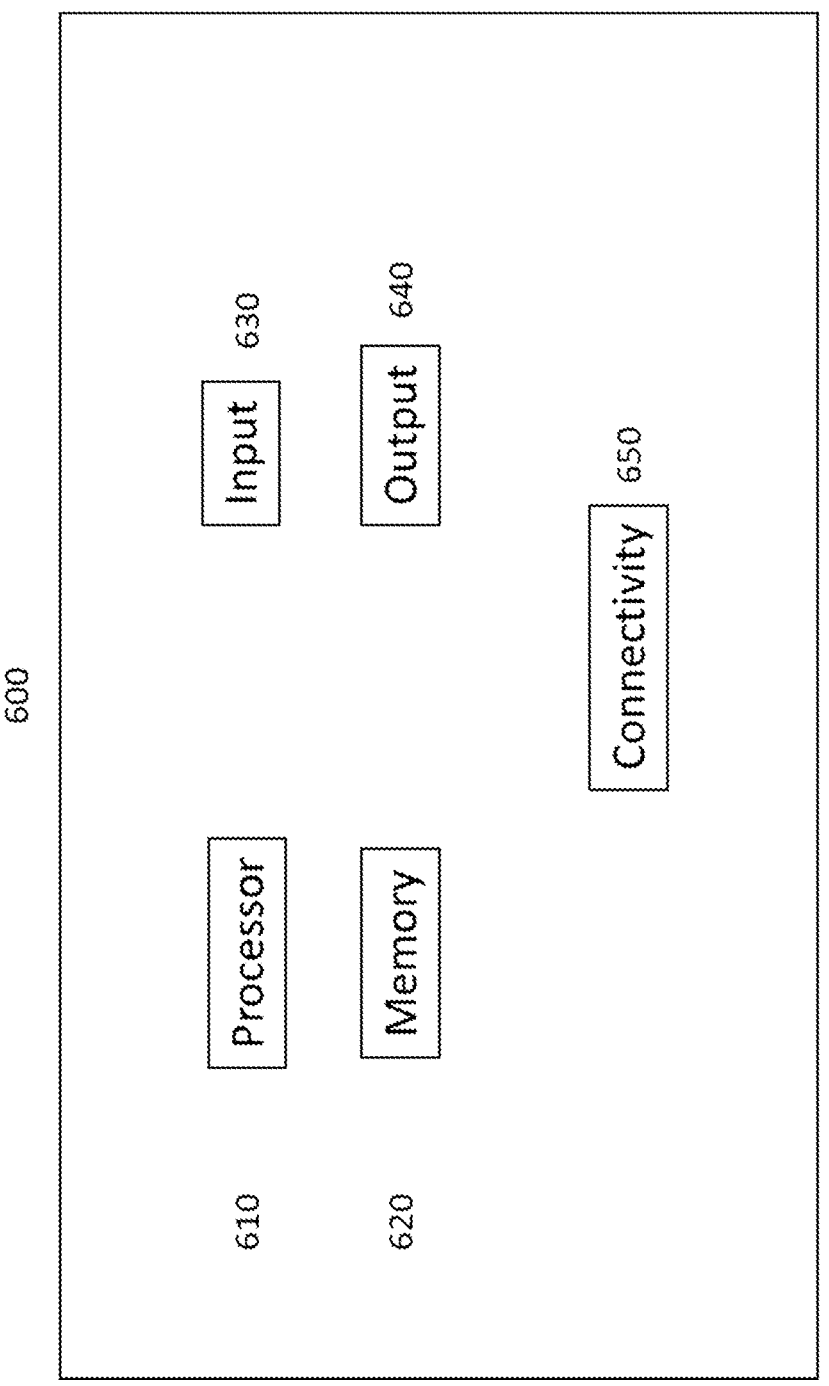
FIG. 6 illustrates an exemplary embodiment of a computing apparatus.

It is to be noted that the apparatus 600 may further comprise various component not illustrated in the FIG. 6. The various components may be hardware component and/or software components.

Even though the invention has been described above with reference to exemplary embodiments according to the accompanying drawings, it is clear that the invention is not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described exemplary embodiments may, but are not required to, be combined with other exemplary embodiments in various ways. The scope of protection sought for various embodiments of the invention is set out by the independent claims. If any exemplary embodiments and features described in this specification should not fall under the scope of the independent claims, those are to be interpreted as examples useful for understanding various embodiments of the invention.

The invention claimed is:

1. A method comprising:
   detecting a reflector unit using optical detection means comprising one or more of: a multilayer LIDAR; time of flight camera; or stereo camera;
   where the reflector unit comprises a plurality of reflector elements arranged in a pre-determined manner, the reflector elements having different planar orientations with respect to each other;
   identifying the reflector unit based, at least partly, on its characteristic reflector element orientation; and
   determining a location of a container handling equipment based, at least partly, on the identified reflector unit.

2. A method according to claim 1, further comprising providing an indication of the determined location to an operating management software.

3. A method according to claim 1, wherein the location is used to operate the container handling equipment in an automated manner.

4. A method according to claim 1 wherein characteristics of the reflector unit are unique within a coverage area of a wireless access point.

5. A method according to claim 1 wherein the plurality of reflector elements are identical.

6. A method according to claim 1, wherein the location of the reflector unit is a known location.

7. A method according to claim 1, wherein at least one other reflector unit is detected for determining the location.

8. A method according to claim 1, wherein characteristics of the reflector unit comprise at least one of the following: reflection pattern, shape, size, reflectivity, texture, amount of reflector elements, no reflection at a location dedicated for a reflector element of the reflector unit, and/or installation height of the reflector elements comprised in the reflector unit.

9. A method according to claim 1, wherein the reflector unit is comprised in at least one of the following: a light pole, a traffic light platform or ship-to-shore gantry crane.

10. A method according to claim 1 wherein determining the location further comprises detecting location using RF-based positioning technique.

11. An apparatus comprising:
    an optical detection means comprising one or more of: a multilayer LIDAR; time of flight camera; or stereo camera;
    at least one processor, and at least one memory including a computer program code, wherein the at least one memory and the computer program code are configured, with the at least one processor, to cause the apparatus to:
    detect a reflector unit that comprises a plurality of reflector elements arranged in a pre-determined manner, the reflector elements having different planar orientations with respect to each other;
    identify the reflector unit based, at least partly, on its characteristic reflector element orientation; and
    determine a location of a container handling equipment based, at least partly, on the identified reflector unit.

12. An apparatus according to claim 11 wherein the apparatus is comprised in an automated container handling equipment.

13. An apparatus according to claim 12 wherein the automated container handling equipment is a straddle carrier.

14. A computer program product comprising computer program code stored in a non-transitory memory medium, the computer program code being configured to cause an apparatus, when executing the program code by a processor circuitry, to perform at least the following:

detect a reflector unit using optical detection means comprising one or more of: a multilayer LIDAR; time of flight camera; or stereo camera where the reflector unit comprises a plurality of reflector elements arranged in a pre-determined manner, the reflector elements having different planar orientations with respect to each other;

identify the reflector unit based, at least partly, on its characteristic reflector element orientation; and determine a location of a container handling equipment based, at least partly, on the identified reflector unit.

* * * * *